June 18, 1940.  F. S. SMITH  2,204,735
FIRE SAFETY DEVICE FOR AUTOMOBILES OR AIRPLANES
Filed May 20, 1939  2 Sheets-Sheet 1

Inventor
F. S. Smith
By Clarence A. O'Brien
and Hyman Berman
Attorneys

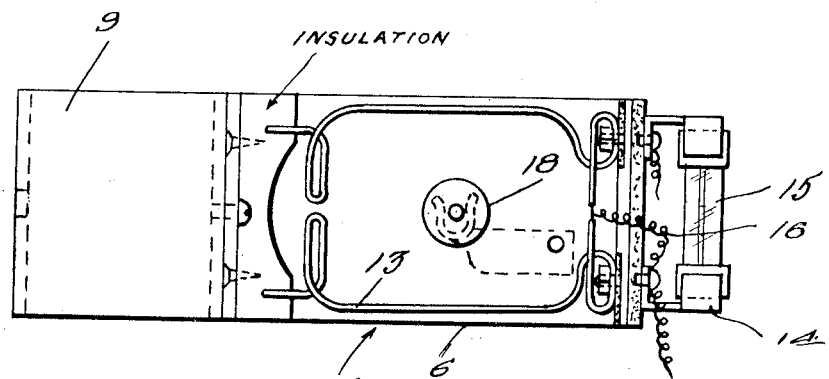
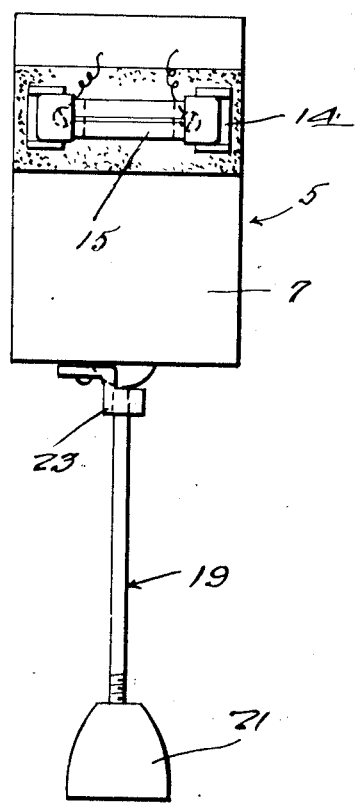
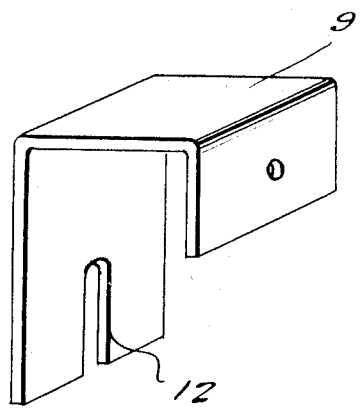

Patented June 18, 1940

2,204,735

UNITED STATES PATENT OFFICE 2,204,735

FIRE SAFETY DEVICE FOR AUTOMOBILES OR AIRPLANES

Floyd S. Smith, Portsmouth, Va., assignor of one-third to Wm. H. Hatchett, Portsmouth, Va.

Application May 20, 1939, Serial No. 274,852

2 Claims. (Cl. 200—52)

This invention relates to a fire safety device for automobiles, airplanes or any other type of internal combustion propelled vehicle, and has for the primary object the provision of a device of this character which is in the form of an automatic circuit breaker electrically connected in the ignition system of the engine of an automobile or airplane for breaking the ignition circuit when the automobile or airplane, from an accident or any other cause, assumes a dangerous angular position from a normal operating position so that the engine will be automatically stopped to prevent catching fire to the automobile or airplane by continuing running after the automobile or airplane has assumed an abnormal position to a normal operating position, consequently preventing loss of property and lives by fire.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating an automatic circuit breaker forming a safety fire device for an automobile, airplane or the like and constructed in accordance with my invention.

Figure 2 is a top plan view illustrating the device.

Figure 3 is an end elevation illustrating the device.

Figure 5 is a perspective view of a bracket for mounting of the frame of the circuit breaker onto an automobile or airplane.

Figure 1:
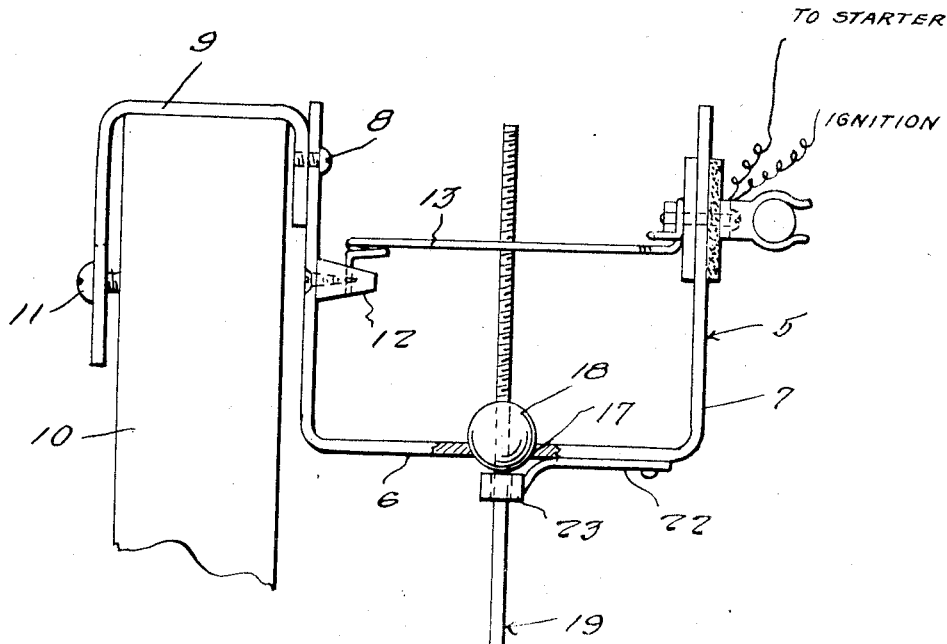
Figure 4:
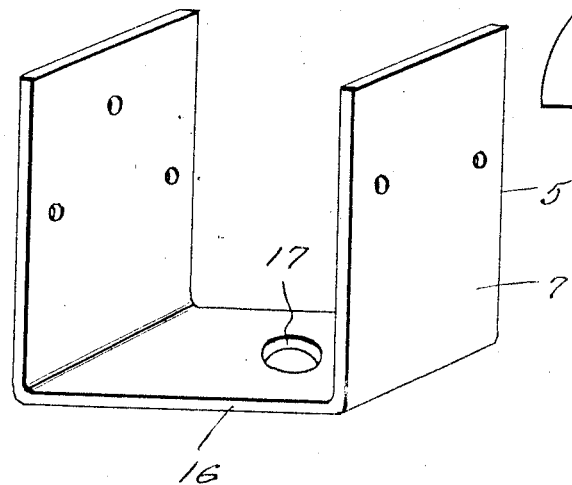
Figure 4 is a perspective view illustrating a frame of the circuit breaker.
Figure 6:
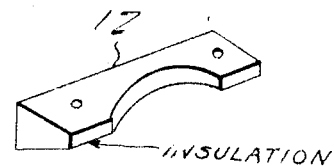
Figure 6 is a perspective view illustrating one of the mountings for the contacts of the circuit breaker.

Referring in detail to the drawings, the numeral 5 indicates a substantially U-shaped frame including a connecting portion 6 and parallel portions 7. Secured to one of the parallel portions 7 by a bolt or like fastener 8 is a substantially U-shaped clamp 9 adapted to be brought into engagement with some suitable part of an automobile or airplane, as shown at 10, and held in place by a set screw 11 extending through a slot 12 for the purpose. The clamp 9 besides supporting the frame 5 on the automobile or airplane also forms an electric ground for the frame onto the automobile or airplane.

An insulated block or support 12 is suitably secured on one of the parallel portions 7 and has connected thereto ends of contact elements or rods 13 which are shaped to coact with each other in forming a contact arrangement of loop formation. The other ends of the contact elements or rods are suitably secured on and insulated from the other parallel portions 7 of the frame. By referring to Figure 2 it will be seen that the contact rods 13 are looped upon themslves to form end portions and parallel portions. Mounted on the last-named parallel portions of the bracket and insulated therefrom is a fuse holder 14 in the form of clips to removably receive a fuse 15. The fuse and its clips are electrically connected in an ignition system (not shown) of an engine of an airplane or automobile. A conductor 16 electrically connects one of the clips of the fuse holder to the contact elements or rods 13 so that when either of said contact rods or elements is electrically grounded to the frame by means which will be hereinafter more fully described, the ignition will be short circuited and thereby blow out the fuse and consequently stop the operation of the engine.

An opening 17 is formed in the connecting portion 6 of the bracket and forms a seat for a ball 18 forming a part of a pendulum 19. The pendulum 19 further includes a rod 20 threaded through the ball 18 and carrying at its lower end a weight 21 normally maintaining the rod in a vertical position. The upper portion of the rod extends between the contact elements or rods 13 and during normal operation of the automobile or airplane the rod is spaced from said contact rods or elements. However, should the automobile or vehicle assume a position at an angle dangerous to its normal operating position from any cause such as an accident, one or the other of the contact elements 13 will engage the rod 20 and thereby ground the ignition system through the fuse to bring about blowing out of the fuse, consequently stopping the operation of the engine until such time that the ignition is restored to operating condition by the replacement of the fuse by a new fuse.

Thus it will be seen that should the airplane from some cause move into a position that would be dangerous to its occupants, the ignition system of the engine will be automatically broken. This also applies to the automobile when equipped with this invention. Frequently, automobiles in accidents are caused to turn over or assume such angular position with respect to normal operating or upright position that it will endanger the automobile to fire caused by gasoline flowing from the engine and becoming ignited if the engine is permitted to run during the time of the automobile occupying the abnormal position.

When the device is employed on an airplane, a latch element 22 is pivotally mounted on the connecting portion 6 of the frame and includes a spring clip 23 which may be brought into engagement with the rod 20 to prevent said rod and frame from having relative movement, consequently preventing the contact elements 13 from engaging the rod 20 to break the ignition system of the engine. When the airplane is assuming flight that may be termed "stunt flights," it would be desirous to prevent the breaking of the ignition system of the engine also it may be found necessary in storms or the like to render the circuit breaker inoperative.

It is believed that the foregoing description, when taken in connection with the drawings will fully set forth the construction and advantages of this invention to those skilled in the art to which such a device relates, so that further detailed description will not be required.

What is claimed is:

1. In a device of the character set forth comprising a substantially U-shaped frame including parallel portions and a connecting portion, a substantially U-shaped clamp secured to one of the parallel portions and engaging a portion of a vehicle and establishing electrical connection between the frame and the vehicle, contact elements mounted on the parallel portions and arranged to substantially encircle a selected area between the parallel portions, means for electrically connecting said contact elements with a fuse of an ignition system of a vehicle, said frame having an opening, a ball seated in said opening, a weighted rod adjustably secured to said ball and extending into said area to engage either of said contact elements on excessive movement of the frame with respect to the weighted rod to bring about destroying of the fuse.

2. In a device of the character set forth comprising a substantially U-shaped frame including parallel portions and a connecting portion, a substantially U-shaped clamp secured to one of the parallel portions and engaging a portion of a vehicle and establishing electrical connection between the frame and the vehicle, contact elements mounted on the parallel portions and arranged to substantially encircle a selected area between the parallel portions, means for electrically connecting said contact elements with a fuse of an ignition system of the vehicle, said frame having an opening, a ball seated in said opening, a weighted rod adjustably secured to said ball and extending into said area to engage either of said contact elements on excessive movement of the frame with respect to the weighted rod to bring about destroying of the fuse, a securing device pivoted on the connecting portion of the frame and including a spring clip adapted to be moved in engagement with said rod for locking said rod against relative movement with respect to the frame and positioned in said area spaced from the contact elements.

FLOYD S. SMITH.